Sept. 20, 1932.   C. R. JEFFREYS   1,877,765
AUTOMATIC CUSHION GEAR
Filed Dec. 11, 1930   2 Sheets-Sheet 1
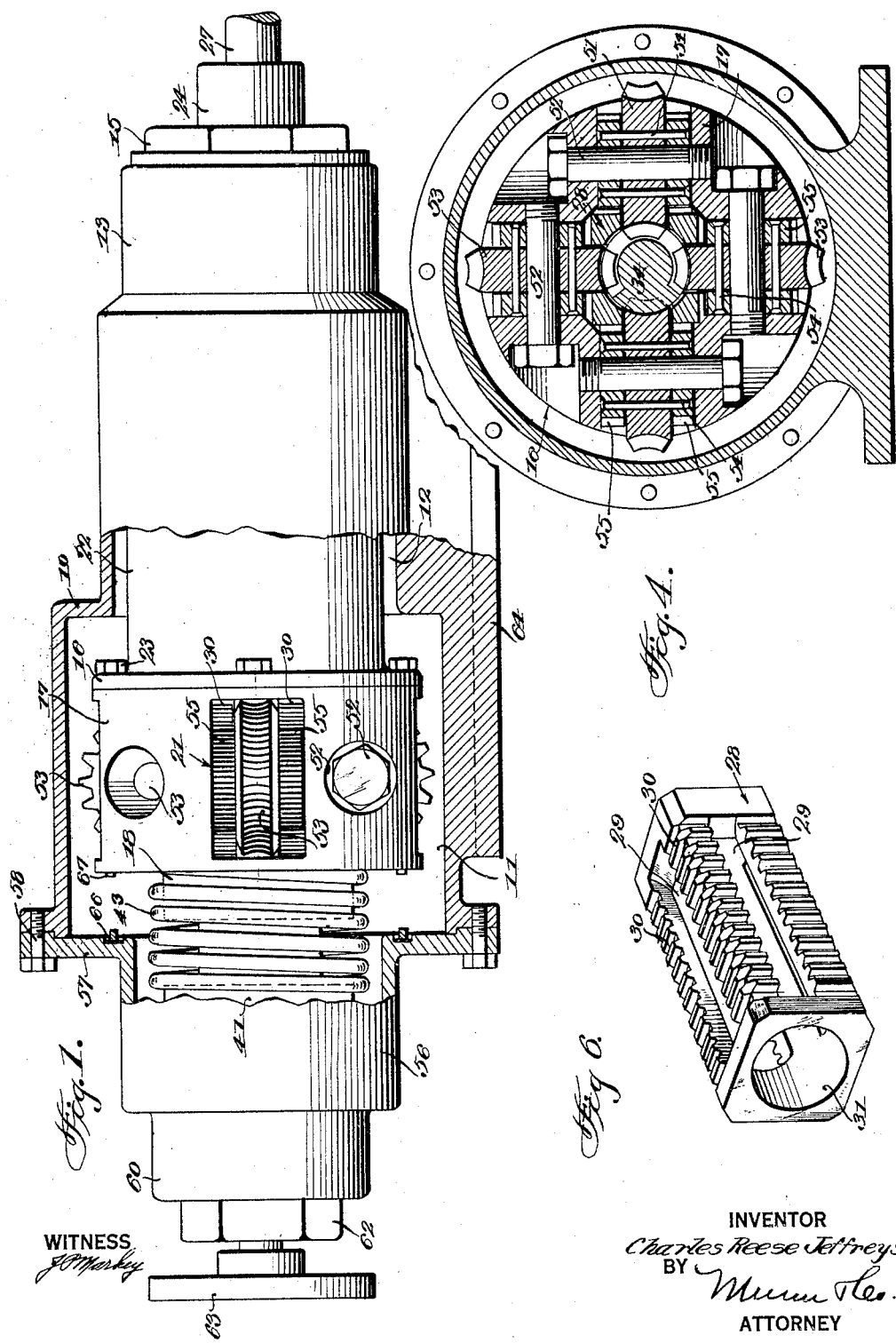
INVENTOR
Charles Reese Jeffreys
BY
ATTORNEY Sept. 20, 1932.    C. R. JEFFREYS    1,877,765
AUTOMATIC CUSHION GEAR
Filed Dec. 11, 1930    2 Sheets-Sheet 2
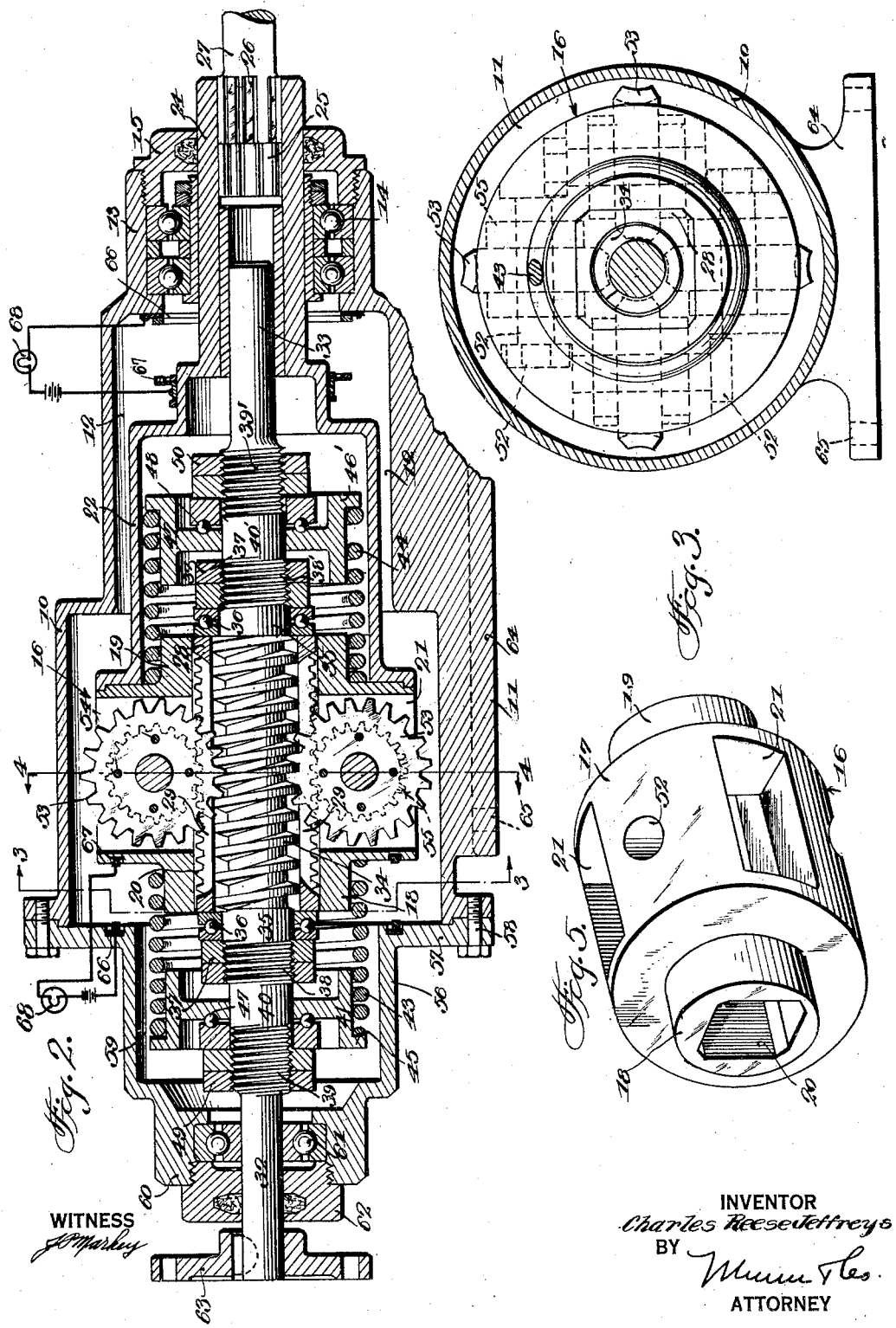
WITNESS
INVENTOR
Charles Reese Jeffreys
BY
ATTORNEY Patented Sept. 20, 1932

1,877,765

UNITED STATES PATENT OFFICE

CHARLES R. JEFFREYS, OF McKEESPORT, PENNSYLVANIA

AUTOMATIC CUSHION GEAR

Application filed December 11, 1930. Serial No. 501,722.

My invention relates to means for cushioning the torque in power transmitting shafts, and it consists in the constructions, arrangements and combinations herein described and claimed.

An object of my invention is the provision of a cushioning means which may be readily installed in a drive shaft, whereby the power thrust applied to a part of the device is imparted to a spring cushion element which takes up the twist or torque before transmitting the impulse to the driven element.

It is a further object of the invention to provide a torque cushioning means in which a neutral zone is involved, permitting acceleration of the power unit, before the load is fully taken up by the driven shaft, thus obviating shocks, twisting strains, undue vibrations and stalling of the power unit.

It is a still further object of the invention to provide a signalling means associated with the cushioning means for audibly or visually indicating an overload of the mechanism.

Additional objects, advantages and features of invention will be apparent from the following description, considered in conjunction with the accompanying drawings wherein:—

Figure 1 is a side elevation of my device, partly in section,

Figure 2 is a longitudinal sectional view,

Figure 3 is a cross section on the line 3—3 of Figure 2,

Figure 4 is a cross section on the line 4—4 of Figure 2,

Figure 5 is a detail perspective view of the carrier,

Figure 6 is a detail perspective view of the rack.

In carrying out my invention, I provide a casing 10 having an open ended chamber 11 and concentric reduced chamber 12. The reduced chamber 12 includes a boss 13 within which there is disposed a roller bearing assembly 14. A packing gland 15 effectively seals the boss, as well as affording means for retaining the bearing assembly in position.

A gear carrier, generally indicated by the reference character 16 is provided, and comprises a cylindrical body 17 having front and rear bosses 18 and 19 respectively, and a longitudinal squared bore 20. Radial slots 21 are formed in the body 17 and open upon the bore 20.

Concentric with the boss 19 the body 17 has an annular recess, within which a cap 22 is seated and bolted as at 23. The cap 22 terminates in a reduced end 24 forming a hollow shaft which is revolubly mounted in the roller bearing assembly 14 and projects through the packing gland 15. The outer extremity of the hollow shaft 24 is provided with internal splines 25 adapted to engage with intermeshing splines 26 of a driven shaft 27. It should be here noted that the splines 25 extend for a considerable distance inwardly upon the interior of the shaft portion 24, permitting longitudinal sliding movement of the carrier 16, as will be explained more fully hereinafter.

Within the bore 20 of the body 17 there is mounted a hollow rectangular rack bar 28, this bar being of a length to be within the boundaries defined by the bosses 18 and 19 of the body 17. The rack bar 28 has a radial slot 29 formed in each side thereof, thus providing a pair of parallel rack members 30. A like number of radial slots 21 and 29 are involved and are to be aligned, for a purpose which will presently appear.

The rack bar 28 has a circular bore 31 through which a shaft 32 extends, the rear portion of the shaft being journalled in the rear portion of the hollow shaft 24 as at 33. Intermediate the length of the shaft 32, I provide a worm gear 34 of a diameter to be revolubly received within the bore 31, and is of the same length as the rack bar 28. Smooth bearing portions 35 are provided immediately adjacent the termination of the worm gear 34, and roller bearing assemblies 36 are secured in abutting relation to the rack bar 28, by lock nuts 37 screwed upon screw threaded portions 38 and 38′ of the shaft. It will thus be seen that the rack bar 28 is maintained against longitudinal as well as rotary movement upon the shaft, until after the locking of the parts, when the shaft, rack and carrier will revolve as a unit. The shaft 32 also has threaded portions 39 and 39′ spaced a suitable distance from the threaded portions 38 and 38' to provide smooth cylindrical surfaces 40 and 40'.

Upon respective surfaces 40 and 40' of the shaft there is loosely mounted, spring-retainer caps 41 and 42, these caps being of the same diameter as the bosses 18 and 19. Helical springs 43 and 44 are disposed around respective bosses 18 and 19 and caps 41—42, one end portion of each spring abutting against respective ends of the body 17 while the opposite ends of the springs bear against flanges 45—46 of each respective cap.

Each cap 41—42 is provided with a concentric recess for reception of ball bearings 47—48, and lock nuts 49—50 retain the bearings and caps in position. It will be understood, of course, that the tension of the springs 43—44 may be varied by manipulation of the lock-nuts 49—50.

Attention is now invited to Figures 2 and 4 of the drawings, wherein it will be seen that a composite gear 51 is disposed in each slot 21, and is revoluble upon a shaft 52 which is screw-threaded in apertures 52' formed in the body 17. In the present instance, I have shown four gears 51 disposed at right angles to each other and are in mesh with the worm gear 34 as will now be described.

Each composite gear 51 is composed of a large spur gear 53 and upon opposite sides thereof are secured, as by countersunk rivets 54, smaller gears 55. Thus, the gears 53 and 55 will rotate as a unit.

Due to the size of the gears 53, they project through respective slots 21 of the body 17 and through respective slots 29 of the rack bar 28, and mesh with the worm 34 of the shaft 32. The gears 55 mesh with respective gear racks 30, as clearly shown in Figure 4.

A cap 56 is provided and has an annular flange 57 which abuts the open end of the casing 10, and is secured thereto by bolts 58. The cap 56 is suitably shaped to provide a chamber 59 into which the spring and spring-retainer cap project, and terminates in a boss 60. The boss 60 has a ball bearing assembly 61 mounted therein, and through this assembly the shaft 32 projects. A gland 62 is screw threaded in the boss 60 and securely retains the bearing assembly in position.

In order that power may be applied, a coupling collar 63 is keyed upon the projecting end of the shaft, for connection to any suitable source of power.

As a means for mounting my device, I have shown the casing 10 as including a base 64 which is suitably apertured as at 65 for bolts or the like.

Occasion may arise where it would be desirable to have a signal means for indicating an overload of the mechanism, and it is possible for me to provide such features in the provision of fixed contacts 66 upon the interior of the housing 10 and disposed in opposite ends thereof, and adapted to align with slip-rings 67 mounted upon the rear portion of the cap 22 and the forward end of the carrier 16. The contact 66 and ring 67 are suitably insulated, and are in electrical circuit with a signal 68, which may be either a bell or incandescent lamp.

The operation will be readily understood from the following description thereof.

I will assume that the device is associated with the drive shaft of a motor vehicle, and is interposed between the transmission and the differential. The transmission gears having been brought into mesh in the usual manner and the clutch allowed to function as heretofore rotary motion will be imparted to the shaft 32. Such motion will rotate the worm gear 34, which in turn revolve the gears 53. Since the small gears 55 are fast to the gear 53, they will also be rotated and by virtue of their engagement with the rack members 30, a rearward longitudinal movement of the carrier 16, is effected, compressing the spring 44. As the tension of the spring 44 increases due to compression thereof, a gradual turning movement of the carrier 16 and drive shaft 27 is produced until the tension of the spring has increased to such an extent that the carrier 16 is locked to and rotates with the shaft 32 providing a direct drive to the shaft 27. As soon as the clutch of the transmission is released, the torque of the shaft will be lessened, and the spring 44 then urges the carrier 16 forwardly to its normal neutral position, the spring 43 acting to absorb any sudden rebound of the carrier. As previously stated the rack bar does not move longitudinally with the carrier, and functions solely as a means for effecting movement of the carrier 16. Also, by reason of the squared bore of the carrier which receives the rack, the carrier is retained against rotation, until the final locking action is established between the parts.

In certain cases, it may be possible to overload the mechanism, causing a jamming of the parts, but such possibility is avoided, since prior to any jamming tendency is produced, the slip ring 67 will have been brought into engagement with the fixed contact 66, sounding or displaying the signal 68, warning the operator that a critical stage has been reached.

While I have shown and described my device as applied to the drive shaft of a motor vehicle, I do not so limit myself and it should be understood that the device is applicable to any drive shaft. Further, I do not limit myself to the specific type or number of gears shown, since a greater or lesser number may be employed to meet varying conditions.

I claim:

1. Torque cushioning means comprising a pair of shafts, a housing for one of said shafts and providing a bearing for one end thereof, splines upon said bearing, splines upon said other shaft, the splines of said bearing and shaft adapted to intermesh and operatively connect said shaft to said bearing, a worm gear carried by said first-named shaft, a gear carrier slidable upon said shaft and having gears operatively associated with said worm gear, cap members upon said first named shaft and positioned at opposite ends of said gear carrier and spring means interposed between said cap members and said carrier, whereby compression of the springs to a predetermined degree will establish driving connection between said shafts.

2. Torque cushioning means comprising a fixed casing having bearings at its ends, a gear carrier revolubly and longitudinally movable therein, a revoluble shaft journaled in one end of said casing and in said carrier, a worm gear upon said shaft, a cap thereon, a compression spring mounted between said carrier and said cap, a driven shaft, a gear rack disposed around said worm, gears carried by said carrier in mesh with said worm gear and said rack whereby rotary motion of said worm will impart longitudinal movement of said gear carrier to establish an operative relation between the two shafts when the torque of the first shaft reaches a predetermined degree.

3. Torque cushioning means comprising a fixed casing having bearings at its ends, a gear carrier revolubly and longitudinally movable therein, a revoluble shaft journaled at one end of said casing and in said carrier, a worm gear upon said shaft, a gear rack disposed around said worm, means for retaining said rack against longitudinal movement, cap members disposed outwardly of said means, compression springs disposed between respective ends of said carrier and said cap members, a driven shaft, gears mounted in said carrier and in mesh with said worm gear and said rack gear, whereby rotary motion of said worm gear will impart longitudinal movement of said gear carrier to establish an operative relation between the two shafts when the torque of the first shafts receives a predetermined degree.

4. Torque cushioning means comprising a fixed casing having bearings at its ends, a gear carrier revolubly and longitudinally movable therein, a revoluble shaft journaled at one end of said casing and in said carrier, a worm gear upon said shaft, a gear rack disposed around said worm, means for retaining said rack against longitudinal movement, cap members disposed outwardly of said means, compression springs disposed between respective ends of said carrier and said cap members, a driven shaft, gears mounted in said carrier and in mesh with said worm gear and said rack gear, whereby rotary motion of said worm gear will impart longitudinal movement of said gear carrier to establish an operative relation between the two shafts when the torque of the first shaft reaches a predetermined degree, and signal means for indicating excessive torsional twist between said shafts.

5. Torque cushioning means comprising a fixed casing having bearings at its ends, a gear carrier revolubly and longitudinally movable therein, said gear carrier having a plurality of slots, a revoluble shaft journaled in one end of said casing and in said carrier, a worm gear upon said shaft, a gear rack disposed around said worm, roller bearings disposed adjacent respective ends of said rack and affording a support for said shaft, means for retaining said bearings in position, cap members carried by said shaft and disposed outwardly of said last-named means, compression means mounted between respective ends of said carrier and said cap members, a driven shaft, composite gears revolubly mounted in the slots of said carrier, and including a large gear in mesh with said worm gear, and a pair of small gears in mesh with said rack bar, whereby rotary motion of said worm gear will impart longitudinal movement of said gear carrier to compress one of said springs to establish an operative relation between the two shafts when the torque of the first shaft reaches a predetermined degree.

6. Torque cushioning means comprising a fixed casing having bearings at its ends, a gear carrier having a plurality of angularly disposed slots, a revoluble shaft journaled in one end of said casing and in said carrier, a worm gear upon said shaft, a rectangular gear rack disposed within said carrier and around said worm, said gear rack having slots formed in the sides thereof and adapted to align with the slots of said gear carrier, means upon opposite ends of said rack for holding said rack against longitudinal movement, cap members upon said shaft and disposed outwardly from said last-named means, compression means mounted between respective ends of said carrier and said cap members, a driven shaft, a composite gear revolubly mounted in the slots of said gear carrier and including a large gear in mesh with said worm gear, and a pair of small gears in mesh with said rack bar, whereby rotary motion of said worm gear will impart longitudinal movement of said carrier to compress one of said springs to establish an operative relation between the two shafts when the torque of said first shaft and compression of the spring reaches a predetermined degree.

7. A torque cushioning means comprising a fixed casing having end bosses, bearings therein, a gear carrier mounted within said casing and having a hollow shaft journaled in one of said bearings but spaced longitudinally therefrom, splines upon the interior of said hollow shaft, a driven shaft having splines for intermeshing engagement with said first-named splines, a revoluble shaft mounted in the other of said bearings and projecting into said hollow shaft, a worm gear formed upon said revoluble shaft, a rectangular rack bar disposed around said worm gear, means carried by said shaft for holding said rack against movement, said rack having slots formed in the sides thereof, said gear carrier having angularly disposed slots adapted to align with the slots of said rack bar, composite gears revolubly mounted in each slot of said carrier and including a large gear in mesh with said worm gear and a small gear disposed on opposite sides thereof for intermeshing with said rack bar, caps carried by said revoluble shaft and disposed upon opposite sides of said rack bar, and compression springs interposed between said caps and respective ends of said carrier whereby longitudinal movement of said carrier will compress one of said springs to resist longitudinal movement beyond a predetermined degree and lock said carrier to said revoluble shaft and thereby transmit the torque impulse to said driven shaft.

8. In a torque cushioning means for power shafts, a pair of aligned shafts, a worm gear upon one of said shafts, a gear carrier longitudinally slidable thereon, and having a reduced cap member defining a hollow shaft providing bearings for the adjacent ends of said aligned shafts, means for securing one of said shafts therein, a hollow rack bar fixed upon said first-named shaft and disposed around said worm gear, gears carried by said carrier and in mesh respectively with said worm gear and said rack bar whereby rotary motion of said worm gear will move said carrier longitudinally with respect to said worm gear, cushion means acting against such longitudinal movement of said carrier whereby upon a predetermined degree of compression of said cushion means said carrier and said first-named shaft will rotate in unison, and cushion means upon the opposite end of said carrier for absorbing rebound of said carrier upon uncoupling of said aligned shafts.

9. A signal for torque cushioning means comprising a housing, a pair of aligned rotatable shafts therein, torque absorbing means rotatable with one of said shafts and longitudinally movable thereon to operatively connect said shafts, a fixed contact carried by said housing at opposite ends thereof, a slip ring mounted at opposite ends of said torque absorbing means and adapted to contact with respective fixed contact upon excessive longitudinal movement of said torque absorbing means, and a signal in electrical circuit with said fixed contact and said slip ring.

10. A torque cushioning means comprising a pair of shafts, a housing for one of said shafts and providing a bearing for one end thereof, splines upon said bearing, splines upon said other shaft, the splines of said bearing and shaft adapted to intermesh and operatively connect said shaft to said bearing, a worm gear carried by said first named shaft, a gear carrier slidable upon said shaft and having gears operatively associated with said worm gear, spring retainer means carried by said first named shaft and disposed at opposite ends of said gear carrier, cushion means interposed between said retainer means and said carrier, and gear means associated with said first named gears for moving said carrier whereby an operative relation between the two shafts is provided when the torque of the first named shaft reaches a predetermined degree to transmit the torsional effect to the second named shaft.

CHARLES R. JEFFREYS.